United States Patent
Faure et al.

(10) Patent No.: US 6,711,868 B1
(45) Date of Patent: Mar. 30, 2004

(54) METHOD OF PRODUCING A PACKAGE OF INTERNAL AND EXTERNAL STRUCTURES AND OF ITEMS OF EQUIPMENT, AND METHOD OF ON-SITE CONSTRUCTION USING SUCH A PACKAGE

(75) Inventors: Marcel Faure, Lagny sur Marne (FR); Jean-Claude Le Carpentier, Lagny sur Marne (FR)

(73) Assignee: L'Air Liquide - Societe Anonyme a Directoire et Conseil de Surveillance pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/164,340

(22) Filed: Oct. 1, 1998

(30) Foreign Application Priority Data

Oct. 14, 1997 (FR) .............................. 97 12840

(51) Int. Cl.[7] ................................. B23P 19/00
(52) U.S. Cl. ................... 52/745.17; 29/469; 29/801
(58) Field of Search .................. 52/745.17; 29/426, 29/469, 506, 801; 62/911

(56) References Cited

U.S. PATENT DOCUMENTS

| | | | | |
|---|---|---|---|---|
| 2,146,381 A | * | 2/1939 | Rheem | |
| 2,968,410 A | * | 1/1961 | Hamilton et al. | 414/783 |
| 3,673,754 A | * | 7/1972 | Murashige et al. | 52/745.17 |
| 3,750,413 A | | 8/1973 | Milligan et al. | |
| 4,295,526 A | * | 10/1981 | Hauk et al. | 29/464 X |
| 5,042,149 A | * | 8/1991 | Holland | 29/888.02 |
| 5,349,827 A | * | 9/1994 | Bracque et al. | 62/298 |
| 6,026,627 A | * | 2/2000 | Moore | 52/745.17 X |
| 6,202,305 B1 | * | 3/2001 | Bracque et al. | 29/897 |

FOREIGN PATENT DOCUMENTS

| | | |
|---|---|---|
| DE | 32 48 345 | 6/1984 |
| FR | 2 692 663 | 12/1993 |

* cited by examiner

Primary Examiner—Brian E. Glessner
(74) Attorney, Agent, or Firm—Young & Thompson

(57) ABSTRACT

This method relates to the production of a package (33) by assembling a fluid-confining internal structure (1), an external structure (2) surrounding the internal structure, and at least one functional item of equipment (12, 15) on at least the internal structure. The internal structure (1) is pre-equipped before it is introduced into the external structure (2) by being pulled in along a longitudinal axis of the package. The method is applicable to the construction of packages of air-distillation columns surrounded by their support framework.

15 Claims, 3 Drawing Sheets

METHOD OF PRODUCING A PACKAGE OF INTERNAL AND EXTERNAL STRUCTURES AND OF ITEMS OF EQUIPMENT, AND METHOD OF ON-SITE CONSTRUCTION USING SUCH A PACKAGE

FIELD OF INVENTION

The present invention relates to a method of producing a package by assembling a fluid-confining internal structure, an external structure surrounding the internal structure, and functional items of equipment on at least the internal structure, the internal structure being intended to form at least part of a fluid supply plant.

The invention applies in particular to the production of a package of an air-distillation column surrounded by its support framework and fitted with its functional items of equipment.

BACKGROUND OF THE INVENTION

Installing an air-distillation column, its support framework and its functional items of equipment on an industrial site is a complex operation, in particular because of the large dimensions and the large mass of these structures, which require the use of heavy lifting means, the work of many teams and the implementation of special arrangements for maintaining the safety of personnel, especially because of the heights at which they may have to work.

Preassembling a column, its support structure and its functional items of equipment into a package makes it possible to simplify such an installation. This is because such a package is generally produced in the factory and then shipped to the installation site where the number of operations to be carried out is then limited. This preassembly is particularly advantageous, for example, when the industrial site is exposed to difficult weather conditions or when it is very far from the locations of the company installing the column.

Several methods of producing such a package already exist.

According to a first known method, the column is partially equipped and then the framework is constructed around it by gradually making the various connections necessary and gradually completing the process of equipping the package.

According to a second method, the unequipped column is introduced, using lifting means, into the framework, one of the large side faces of which is entirely clear so as to allow access for the various technicians who will then make the necessary connections and fit the items of equipment. In the final stages of this method, the large side face of the framework is gradually constructed and the package is equipped on this large side face last.

Such methods are complex, slow and expensive, especially because there is little space in which the various technicians can work. In addition, this little space available may also result, on the one hand, in safety problems, several technicians, especially the welders, being forced to work in a small and confined space, and, on the other hand, In production delay problems due to a lack of flexibility in the assembling and/or construction operations.

OBJECT OF THE INVENTION

The object of the invention is to solve the abovementioned problems by providing a method of producing packages which is simpler, less expensive and more rapid, while at the same time reducing the safety problems and assembly errors.

SUMMARY OF THE INVENTION

For this purpose, the subject of the invention is a method of producing a package by assembling a fluid-confining internal structure, an external structure surrounding the internal structure, and functional items of equipment on at least the internal structure, the internal structure being intended to form at least part of a fluid supply plant, characterized in that at least the internal structure is pre-equipped with at least part of at least one functional item of equipment before it is introduced into the external structure by being pulled in along a longitudinal axis of the package.

According to particular embodiments, the method may have one or more of the following characteristics:

- the external structure is pre-equipped with at least part of at least one functional item of equipment before the internal structure is pulled into the external structure;
- since the internal structure is a structure for confining at least one fluid at a temperature significantly different from that of the external structure, the external structure is pre-equipped with at least part of at least one item of equipment intended to be more or less in thermal equilibrium with this external structure;
- since the internal structure is a structure for confining at least one fluid having a temperature significantly different from that of the external structure, the internal structure is pre-equipped with at least part of an item of equipment intended to be more or less in thermal equilibrium with the fluid;
- the internal structure is pulled into the external structure by moving it along rails provided in the external structure when the latter is placed more or less horizontally;
- the internal structure is a cryogenic structure;
- the external structure is at least one section of a thermal insulation jacket;
- the internal structure is at least one section of a distillation column; and
- the external structure is at least one section of a framework for supporting the internal structure.

Finally, the subject of the invention is a method for the on-site construction of an assembly comprising a fluid-confining internal structure intended to form at least part of a fluid supply plant, an external structure surrounding the internal structure, and functional items of equipment joined to at least the internal structure, this assembly having an especially more or less vertical longitudinal axis, characterized in that a package produced as described above is erected on site.

BRIEF DESCRIPTION OF THE DRAWINGS

The invention will be more clearly understood on reading the description which follows, which is given solely by way of example, and with reference to the appended drawings in which.

DETAILED DESCRIPTION OF THE INVENTION

Figure 1:
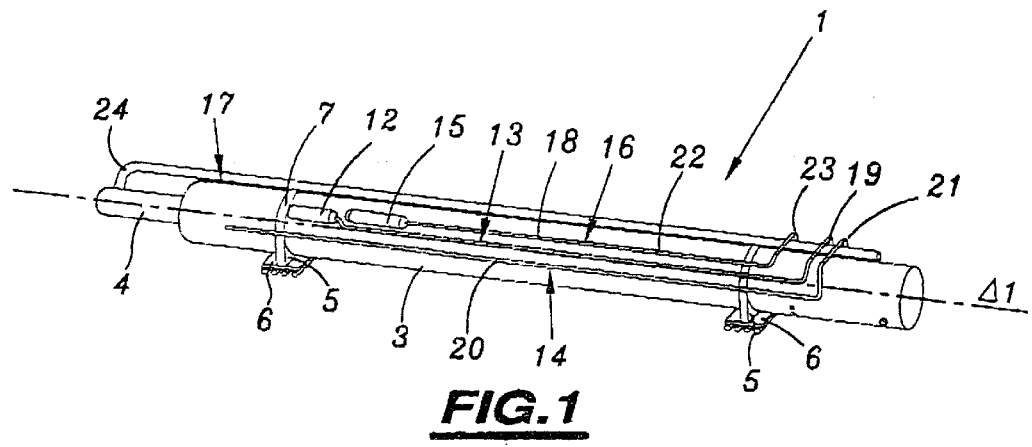
FIGS. 1 and 2 are perspective views illustrating a distillation column and its support framework, respectively, these being pre-equipped according to the invention.
Figure 2:
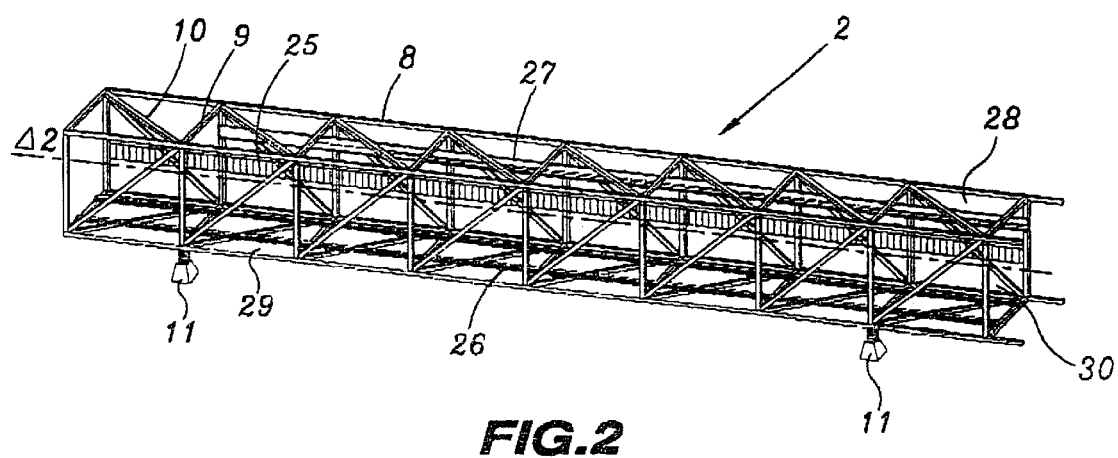

FIGS. 1 and 2 show an air-distillation column 1 and its support framework 2 before they are assembled in order to produce a package.

The column 1, having the general shape of a cylinder with an axis Δ1, comprises a main distillation section 3 and an additional distillation section 4 or "minaret" with an appreciably smaller diameter, which extends the main section 3 at its upper end (to the left in FIG. 1). The main section 3 comprises the medium-pressure part, the low-pressure part and the main reboiler. The column 1 has, for example, a length of approximately 15 metres.

This column 1 rests on two transverse support cradles 5 which are spaced apart and at longitudinal positions as described later.

These cradles 5 are provided with runners 6 having rollers with axes transverse to the column 1. A protective metal belt 7 goes around the column at each cradle 5.

The framework 2 is a metal frame of parallele-pipedal general shape comprising four longitudinal stanchions 8 connected, on each large side face of the framework 2, by cross members 9 and diagonal braces 10. The longitudinal mid-axis of the framework 2 is labelled Δ2 and lies horizontally.

This framework 2 rests on four height-adjustable feet 11.

According to the invention, the column 1 and the framework 2 are pre-equipped for the purpose of producing a package.

Thus, the column 1 is pre-equipped on its external surface with a phase-separating pot 12 and its liquid-nitrogen outlet pipe 13, with a liquid-reflux pipe 14, with a heat exchanger 15 and its liquid feed pipe 16, and finally with a gas outlet pipe 17.

The separating pot 12 may also be connected to a nitrogen-gas outlet pipe (not shown).

These items of equipment have been assembled on the column 1 using techniques conventional to those skilled in the art.

The separating pot 12 has a cylindrical general shape and is fixed to the column 1 with its axis approximately parallel to the axis Δ1.

The pot 12 is connected at its lower part (to the right in FIG. 1) to its outlet pipe 13, which is fixed to the column 1. This pipe 13 comprises a straight main part 18, whose axis lies parallel to the axis Δ1, and is connected to the pot 12, and a U-shaped part 19 for connection to the outside, this being approximately transverse with respect to the column 1 and extending the part 18. When the column 1 is in operation on site, this separating pot 12 is used to produce fresh liquid which will be taken via the pipe 13 to the storage elements external to the column.

The liquid-reflux pipe 14 is fixed to the column 1 and comprises a straight main part 20, whose axis lies parallel to the axis Δ1, and a U-shaped connection part 21, which is approximately transverse with respect to the column 1. The part 20 is connected at one end to the section 3 and at its other end to the part 21.

The heat exchanger 15 has a cylindrical general shape and is fixed to a column 1 with its axis approximately parallel to the axis Δ1.

The exchanger 15 is connected at its lower part to its liquid feed pipe 16, which is fixed to the column 1. This pipe 16 comprises a straight main part 22 whose axis lies parallel to the axis Δ1, and is connected to the exchanger 15, and a U-shaped connection part 23 approximately transverse with respect to the column 1 and extending the part 22.

The gas outlet pipe 17 is connected to the top (to the left in FIG. 1) of the additional section 4 of the column 1 by means of a sharply-bent part 24. This pipe 17 is fixed along the external surface of the column 1, parallel to the axis Δ1.

The pot 12, the pipes 13, 14, 16 and 17 and the exchanger 15 are designed to carry fluids whose temperatures are appreciably less than the temperature of the framework 2, i.e. less than the ambient temperature at the site on which the column is to be installed.

The framework 2 is pre-equipped with an internal ladder 25, with rails 26 for pulling in the column 1, with an instrumentation track 27 and with protective sheet metalwork, not shown for the sake of clarity of the description.

The ladder 25 is placed longitudinally inside the framework 2, on one of the large side faces of the framework 2, labelled 28. It is intended to allow access into the package when the latter is erected on site, as described later.

The rails 26 are longitudinal rails placed inside the framework 2 on the transportation face 29 (at the bottom in FIG. 2) of the framework 2.

The instrumentation track 27 comprises, fixed to a longitudinal support plate, instrumentation piping, instrumentation cables and a gas supply pipe, these being shown diagrammatically for the sake of clarity of the figures. The instrumentation track 27 is a functional item of equipment which allows the operation of the distillation column 1 to be controlled on site. The instrumentation piping includes fluid bleed pipes. The gas supply pipe allows a. gas to be supplied in order to keep moisture-free an insulation which is placed between the column 1 and the framework 2, as described later.

The instrumentation track 27 and, in particular, its support plate are designed to contract during operation of the column 1 appreciably less than the items of equipment fixed to the latter.

The framework 2 is also covered as much as possible with its protective sheet metalwork. In particular, this sheet metalwork is placed on the outside on all the faces of the framework, except on the face 29 and on the bottom 30 of the framework (to the right in FIG. 2). This sheet metalwork is intended to form a jacket for protecting and thermally insulating the column.

After the column 1 and the framework 2 have been pre-equipped, as described with regard to FIGS. 1 and 2, the feet 11 are adjusted in order to ensure that the axis Δ2 is horizontal. This positioning operation may be carried out by using levels or another technique that is conventional to those skilled in the art.

Figure 3:
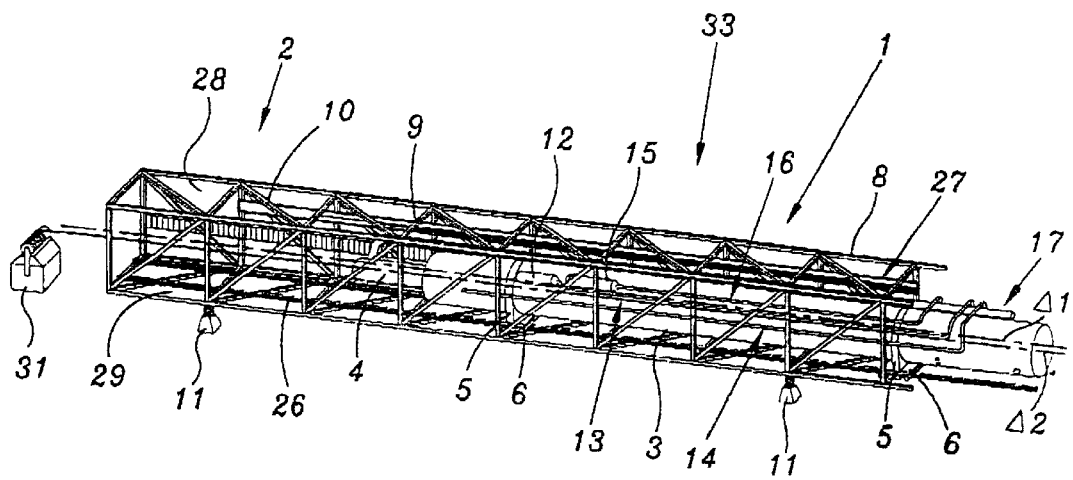
FIGS. 3 and 4 are perspective views illustrating two successive phases in pulling the column shown in FIG. 1 into the framework shown in FIG. 2.
Figure 4:
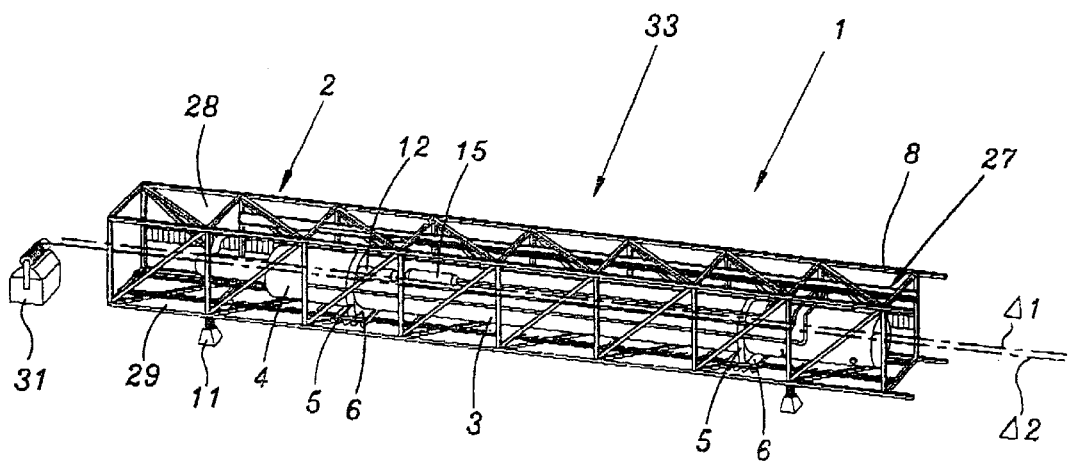

As illustrated in FIGS. 3 and 4, the column 1 is then introduced into the framework 2, by being pulled into it, making the runners 6 run along the rails 26, by means of a winch 31 connected by a cable to the upper end (to the left in FIG. 3) of the column 1.

The column 1 is placed longitudinally in the framework 2 in such a way that the two cradles 5 are each opposite the cross members 9 of each of the large side faces of the framework 2. The longitudinal positions of the cradles 5 with respect to the column 1 have therefore been chosen, by carrying out suitable measurements, in order to obtain this result.

Five screw jacks 32 (FIG. 5) are then placed at each cradle 5, i.e. ten jacks in total for the package 33 under construction, between the column 1 and the framework 2.

Figure 5:
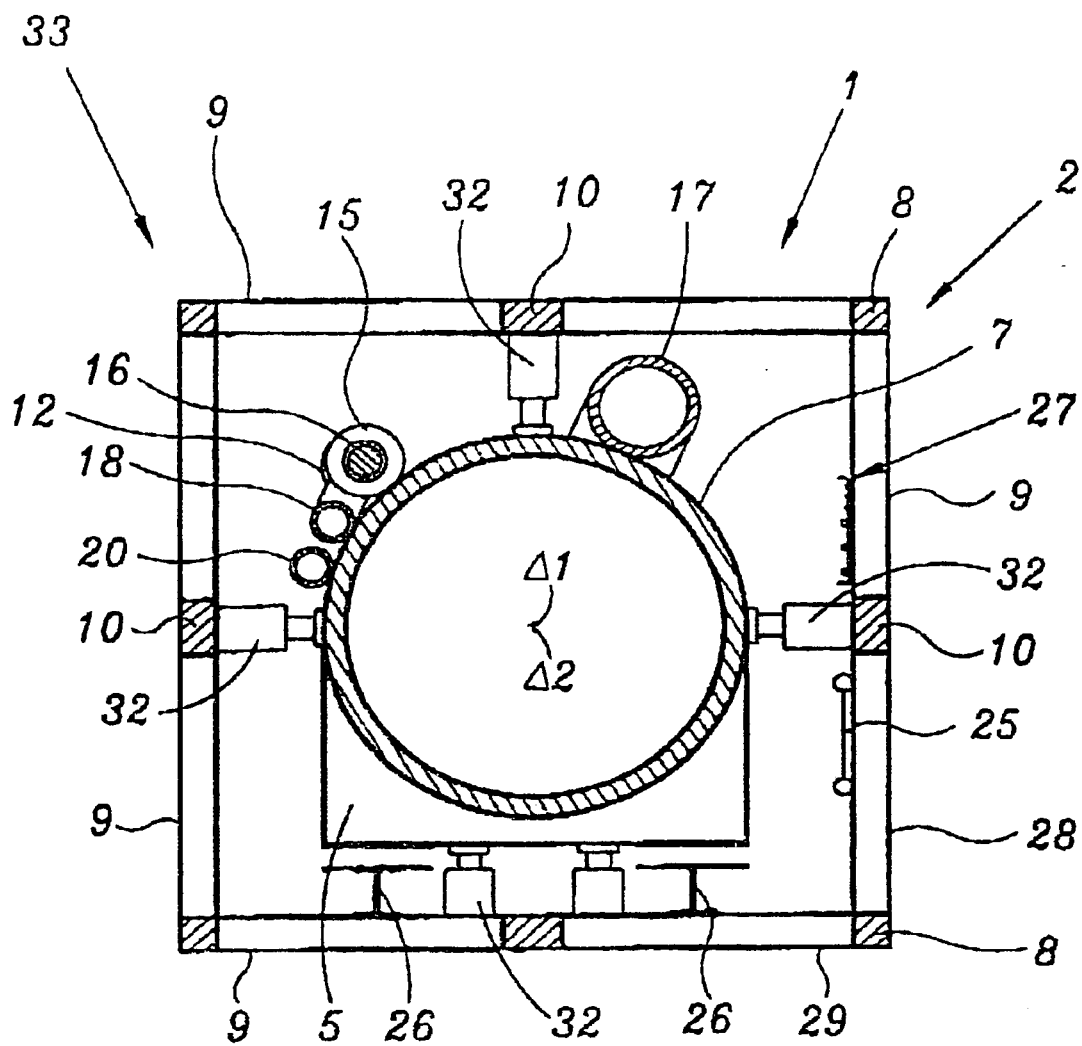
FIG. 5 is a diagrammatic cross-sectional view of the column and the framework shown in FIG. 4, illustrating how the column is positioned with respect to the framework.

As illustrated in FIG. 5, in the case of each cradle 5, a vertical jack 32 is placed between the column 1 and a cross member 9 on the upper (in FIG. 5) large side face of the framework 2 and two horizontal jacks 32 are each placed between the column 1 and a cross member 9 on a vertical (in FIG. 5) large side face of the framework 2. The internal ends of these three jacks 32 bear on and are welded to the belt 7 going around the column 1 and their external ends are fixed to the associated cross members 9 of the framework 2.

Two vertical jacks 32 are also placed between the lower face of the cradle 5 and a cross member 9 on the face 29 of the framework 2. Their upper ends are fixed to the cradle 5 and their lower ends to the framework 2. Next, the runners 6 under the two cradles 5 are removed, as shown in FIG. 5. The column 1 is then positioned with respect to the framework 2 so that their axes Δ1 and Δ2 are parallel and in the desired relative position. The relative position of these two axes may be determined by means of a sighting device or by using another technique that is conventional to those skilled in the art.

This relative position may be modified by adjusting the jacks 32. Preferably, it is chosen so that the column 1 lies more or less in the central position of the framework 2, i.e. such that Δ1 and Δ2 are more or less coincident and define the longitudinal axis of the package 33.

Once the relative positioning between the column 1 and the framework 2 has been completed, they are fastened together, for example by spot welding the nuts of the jacks 32.

Next, the equipping of the package 33 is completed, especially by passing the connection end of the pipe 13 through the protective sheet metalwork of the framework 2 and by connecting the piping and cables of the instrumentation track 27 to the corresponding parts of the column 1.

A conventional insulation is then placed between the column 1 and the framework 2.

Lastly, means are used for protecting the open regions of the package 33, these means consisting, for example, of watertight covers.

The package 33 is then ready to be transported to an industrial site. Once the package 33 is on site, it is erected along its longitudinal axis using lifting means.

The lower ends (to the right in FIG. 4) of the longitudinal stanchions 8 are placed on height-adjustable feet. The verticality of the axis Δ2 is then checked, for example by means of a sighting device or another technique that is conventional to those skilled in the art.

Since the axis Δ1 of the column 1 is parallel to the axis Δ2 of the framework 2, it is easy to ensure that the column 1 is vertical, which is necessary for it to operate properly, by adjusting the respective heights of the feet on which the framework 2 rests.

This then completes the adjustment of the package 33 with respect to the ground on the industrial site.

Finally, the method is completed by laying the protective sheet metalwork on the transportation face 29 of the package 33 and the items of equipment of the package 33 are connected to the environment external to the latter.

Pre-equipping the column and the framework according to the invention allows the various technicians to work in parallel on these two structures without inconvenience, the items of equipment being able to be fitted in any order to the framework and to the column, unlike in the case of the conventional methods of producing packages.

Safety is therefore improved and it is possible to work on practically all the faces of each structure. The risks associated with the concentration of harmful gases in confined spaces are also reduced. Finally, it is possible to construct the framework and equip the latter outside, by being protected from the weather by the protective sheet metalwork.

The number of access openings made in the framework are fewer than in conventional packages, thereby reducing the number of operations of dismantling/reassembling the framework and making it possible to fit the protective sheet metalwork in advance on three large side faces of the framework, instead of, in general, on two as in conventional methods.

The frameworks used for implementing the method according to the invention are, for this reason, more rigid and therefore more easily transportable than in the conventional methods of producing packages.

Finally, all that is needed is a winch for carrying out the pulling-in operation, and the method therefore does not require the use of heavy lifting means in the factory, as in the prior methods of producing a package.

It has been found that there is a saving in manufacturing time of 25 to 30% over the conventional manufacturing methods. More generally, the external structure may be a thermally insulated structure and the internal structure may, for example, be a cryogenic tank, i.e. containing a fluid at a temperature at least approximately 100° C. below the ambient temperature.

The method according to the invention may also be used to produce packages consisting of internal and external structure sections, the internal structure then being, for example, a section of a column and the external structure then being a section of the corresponding framework.

What is claimed is:

1. Method of producing a package having a cryogenic fluid-confining internal structure, an external structure surrounding the internal structure, and functional items of equipment on at least the internal structure, said internal structure being intended to form at least a part of a fluid supply plant, the method comprising the steps of:

pre-equipping at least the internal structure with at least part of at least one functional item of equipment so as to obtain a pre-equipped internal structure;

introducing the pre-equipped internal structure into the external structure by pulling it along a longitudinal axis of the package when said external structure is placed substantially horizontally; and assembling the internal structure and the external structure.

2. The method according to claim 1, wherein the internal structure is structured and arranged to confine at least one fluid at a temperature significantly different from that of the external structure; and the external structure is pre-equipped with at least part of at least one item of equipment intended to be substantially in thermal equilibrium with said external structure.

3. The method according to claim 1, wherein the internal structure is structured and arranged to confine at least one fluid having a temperature significantly different from that of the external structure; and the internal structure is pre-equipped with at least part of an item of equipment intended to be substantially in thermal equilibrium with said fluid.

4. The method according to claim 1, wherein the internal structure is pulled into the external structure by moving said internal structure along rails provided in the external structure.

5. The method according to claim 1, wherein the external structure is at least one section of a thermal insulation jacket.

6. The method according to claim 1, wherein the internal structure is at least one section of a distillation column.

7. The method according to claim 1, wherein the external structure is at least one section of a framework for supporting the internal structure.

8. Method for the on-site construction of an assembly comprising a cryogenic fluid-confining internal structure intended to form at least a part of a fluid supply plant, an external structure surrounding the internal structure, and functional items of equipment joined to at least the internal structure, said assembly having a substantially vertical longitudinal axis, the method comprising erecting on site the package produced according to claim 1.

9. Method of producing a package having a cryogenic fluid-confining internal structure, an external structure surrounding the internal structure, and functional items of equipment on at least the internal structure, said internal structure being intended to form at least a part of a fluid supply plant, the method comprising the steps of:

pre-equipping at least the internal structure with at least part of at least one functional item of equipment so as to obtain a pre-equipped internal structure;

pulling the pre-equipped internal structure into the external structure along a longitudinal axis of the package by moving the internal structure along rails provided in the external structure, when said external structure is placed substantially horizontally; and assembling the internal structure and the external structure.

10. The method according to claim 9, wherein the internal structure is structured and arranged to confine at least one fluid at a temperature significantly different from that of the external structure; and the external structure is pre-equipped with at least part of at least one item of equipment intended to be substantially in thermal equilibrium with said external structure.

11. The method according to claim 9, wherein the internal structure is structured and arranged to confine at least one fluid having a temperature significantly different from that of the external structure; and the internal structure is pre-equipped with at least part of an item of equipment intended to be substantially in thermal equilibrium with said fluid.

12. The method according to claim 9, wherein the external structure is at least one section of a thermal insulation jacket.

13. The method according to claim 9, wherein the internal structure is at least one section of a distillation column.

14. The method according to claim 9, wherein the external structure is at least one section of a framework for supporting the internal structure.

15. Method for the on-site construction of an assembly comprising a cryogenic fluid-confining internal structure intended to form at least a part of a fluid supply plant, an external structure surrounding the internal structure, and functional items of equipment joined to at least the internal structure, said assembly having a substantially vertical longitudinal axis, the method comprising erecting on site the package produced according to claim 9.

* * * * *